Figure 1:
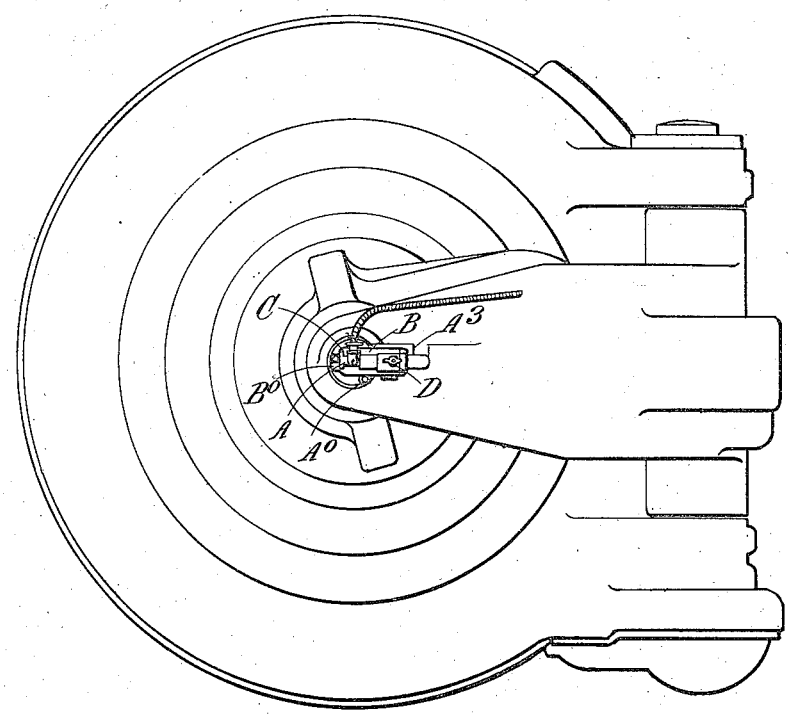

A. T. DAWSON & G. T. BUCKHAM.
FIRING MECHANISM OF BREECH LOADING GUNS.
APPLICATION FILED DEC. 18, 1911.

1,091,638.

Patented Mar. 31, 1914.
6 SHEETS—SHEET 1.

Witnesses:
Minerva Lobel
Agnes Bell

Inventors:
Arthur Trevor Dawson
& George Thomas Buckham
By Pennie Davis & Goldsborough A. T. DAWSON & G. T. BUCKHAM.
FIRING MECHANISM OF BREECH LOADING GUNS.
APPLICATION FILED DEC. 18, 1911.
1,091,638.
Patented Mar. 31, 1914.
6 SHEETS—SHEET 2.
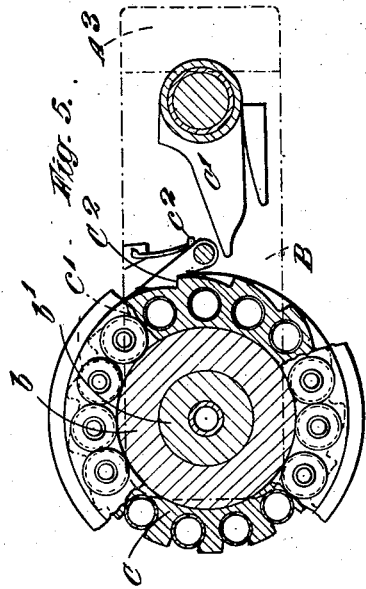
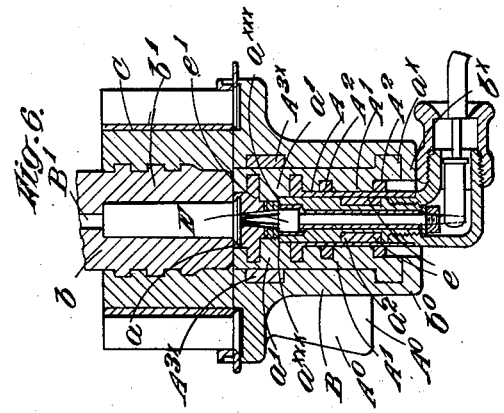
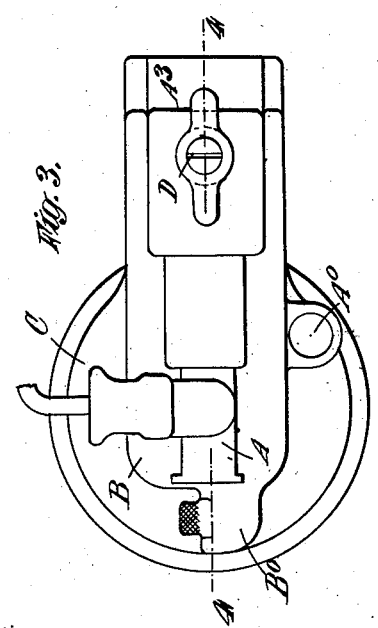
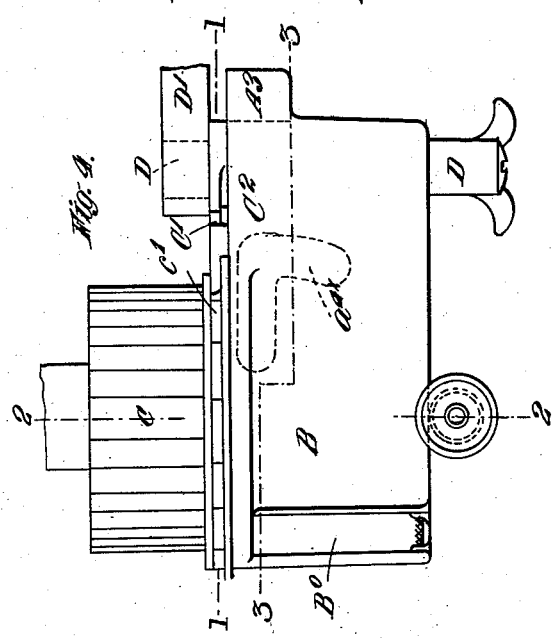
Inventors:
Arthur Trevor Dawson
& George Thomas Buckham A. T. DAWSON & G. T. BUCKHAM.
FIRING MECHANISM OF BREECH LOADING GUNS.
APPLICATION FILED DEC. 18, 1911.
1,091,638.
Patented Mar. 31, 1914.
6 SHEETS—SHEET 3.
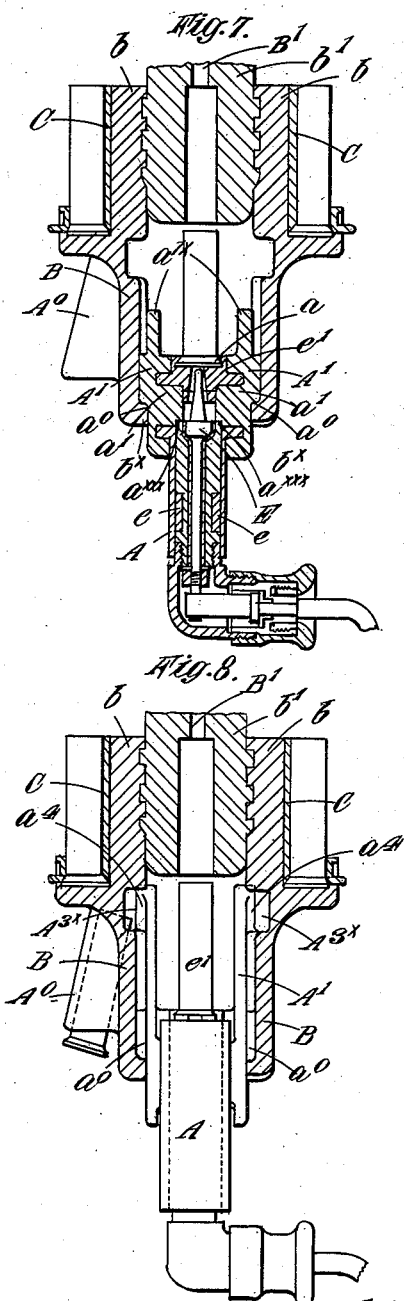
Witnesses:
Inventors:
Arthur Trevor Dawson
& George Thomas Buckham A. T. DAWSON & G. T. BUCKHAM.
FIRING MECHANISM OF BREECH LOADING GUNS.
APPLICATION FILED DEC. 18, 1911.
1,091,638.
Patented Mar. 31, 1914.
6 SHEETS—SHEET 4.
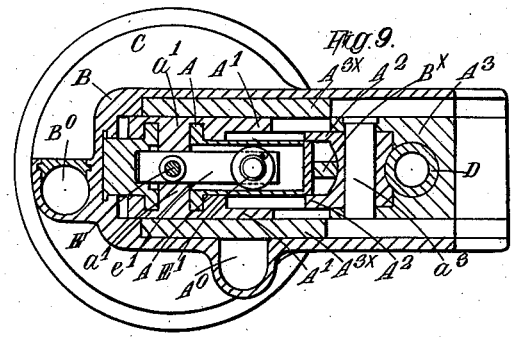
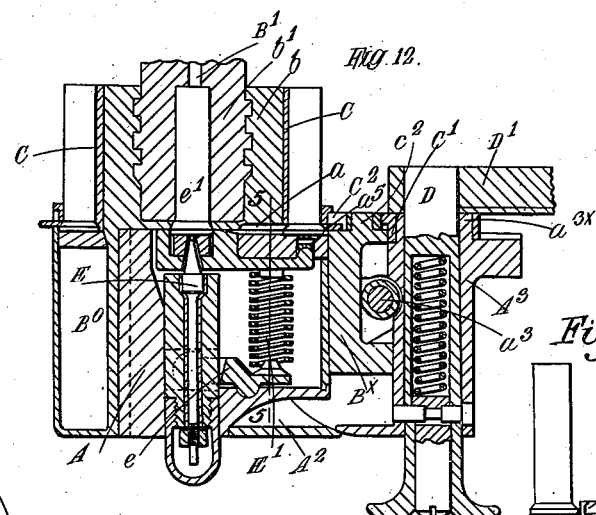
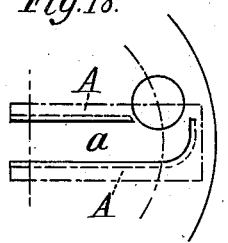
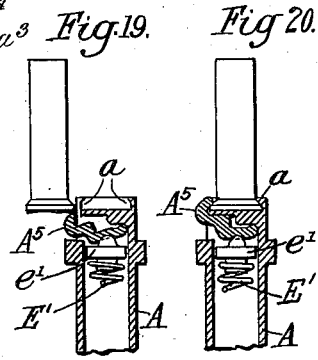
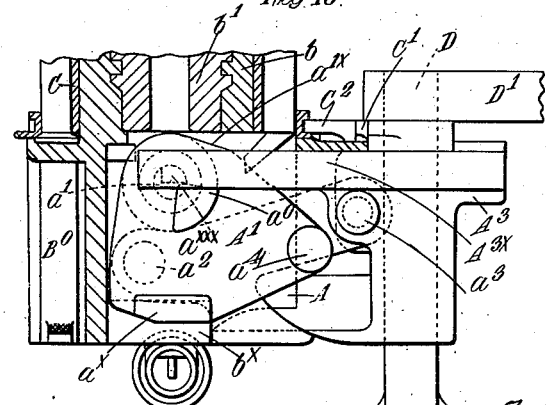
Witnesses:
Inventors:
Arthur Trevor Dawson
& George Thomas Buckham

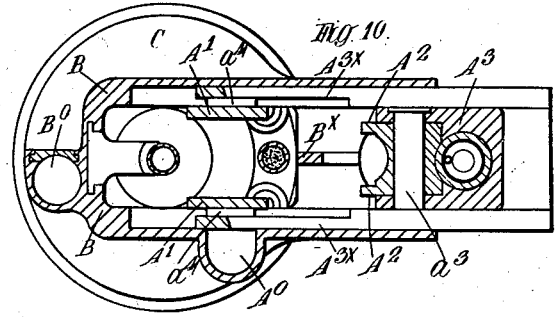
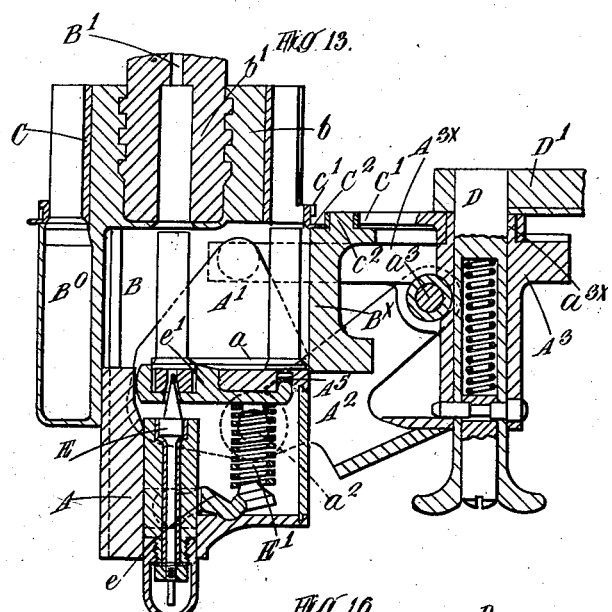
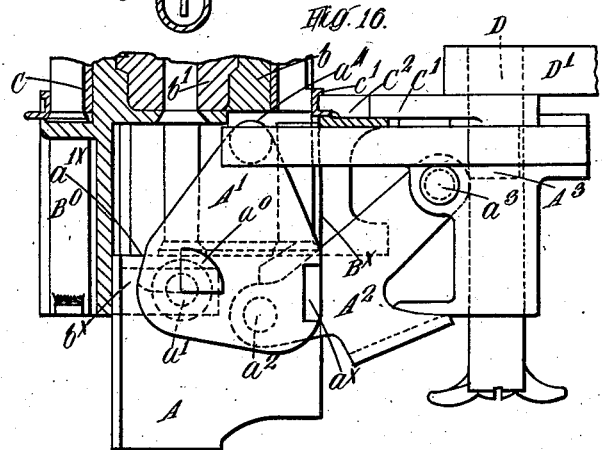

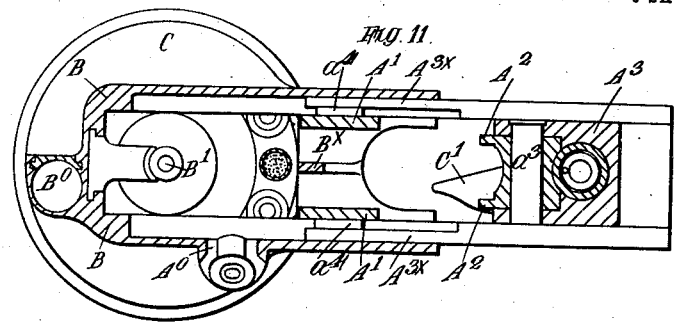
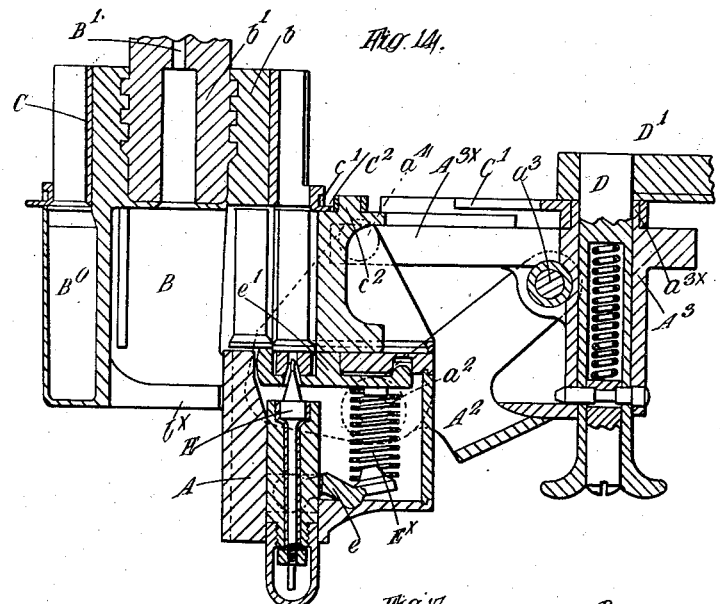
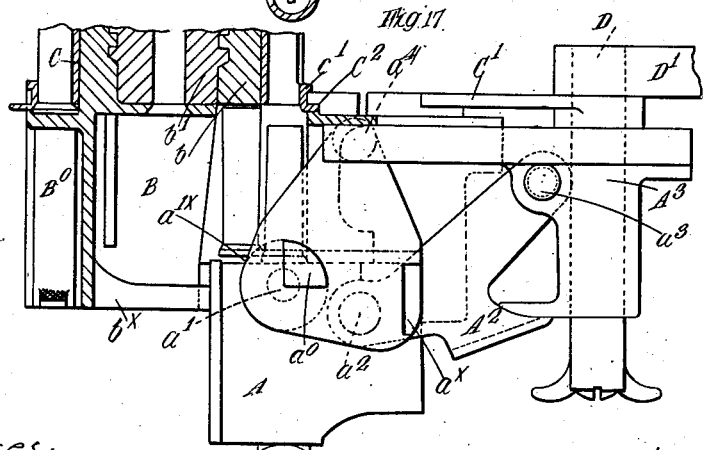

UNITED STATES PATENT OFFICE.

ARTHUR TREVOR DAWSON AND GEORGE THOMAS BUCKHAM, OF WESTMINSTER, LONDON, ENGLAND, ASSIGNORS TO VICKERS LIMITED, OF WESTMINSTER, ENGLAND.

FIRING MECHANISM OF BREECH-LOADING GUNS.

1,091,638.   Specification of Letters Patent.   Patented Mar. 31, 1914.

Application filed December 18, 1911. Serial No. 666,577.

*To all whom it may concern:*

Be it known that we, ARTHUR TREVOR DAWSON, knight, and GEORGE THOMAS BUCKHAM, both subjects of the King of Great Britain, residing at Vickers House, Broadway, Westminster, in the county of London, England, have invented certain new and useful Improvements in or Relating to the Firing Mechanism of Breech-Loading Guns, of which the following is a specification.

This invention relates to the firing mechanism of breech loading guns and has particular reference to re-priming devices of the kind in which the movement of the lock frame in opening and closing, automatically extracts the used primer or sealing tube from the vent axial and causes a new one to be inserted in its place.

According to the present invention we provide adjacent to the box slide or other convenient part of the mechanism a carrier or magazine adapted to receive say from twelve to eighteen primers and we so construct and arrange the primer manipulating member which may form part of the lock casing, that the opening and closing movements of the breech mechanism cause the said member to extract the used primer from the vent axial and a new primer from the carrier or magazine and to eject the used primer and to then move the new primer into a position to be inserted in the primer chamber of the vent axial by the forward movement of the primer manipulating member. The said primer carrier or magazine may be displaced step by step by a moving part of the mechanism to bring a fresh primer into position to be withdrawn from the magazine at the next operation.

In order that the invention may be clearly understood and readily carried into effect we will describe the same more fully with reference to the accompanying drawings in which:—

Figure 2:
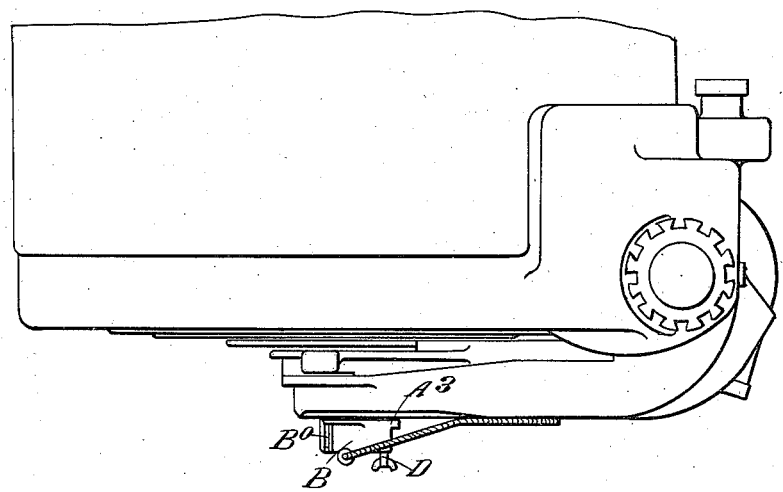

Figures 1 and 2 are respectively an end elevation and a plan of the breech end of a gun provided with our improvements. Fig. 3 is an end elevation of a constructional form of our improved re-priming device detached from the gun. Fig. 4 is a plan of Fig. 3. Fig. 5 is a section taken approximately on the line 1—1 of Fig. 4. Figs. 6, 7 and 8 are vertical sections taken approximately on the line 2—2 of Fig. 4, showing the lock and its parts in the firing position, in the axially displaced position and in the laterally displaced position respectively. Figs. 9, 10 and 11 are sections taken approximately on the line 3—3 of Fig. 4 with the lock in the positions shown in Figs. 6, 7 and 8 respectively. Figs. 12, 13 and 14 are horizontal sections taken approximately on the line 4—4 of Fig. 3, the lock being in the positions shown in Figs. 9, 10 and 11 and Figs. 15, 16 and 17 are sectional plans showing more clearly a constructional form of the lock actuating mechanism, the parts being in the same positions as shown in Figs. 12, 13 and 14 respectively. Fig. 18 is a front elevation of a groove (hereinafter referred to) in the front face of the lock casing. Figs. 19 and 20 are sections taken approximately on the line 5—5 of Fig. 12, showing the parts in two positions as will be hereinafter described.

A is the lock casing, B the box slide and B′ the vent axial.

C represents the primer carrier or magazine which in the example illustrated is in the form of an annular casing or cage disposed axially around the stem $b$ of the box slide B which latter is detachably secured to the stem $b'$ of the vent axial B′ by means of interrupted annular collars in the usual manner. When the aforesaid primer manipulating member forms part of the lock casing A, as in the example shown in the drawings, the front of the said casing is formed with a groove $a$ which extends from the primer chamber of the vent axial B′ to the outer circumference of the primer magazine C when the lock casing is in the closed position as clearly shown in Fig. 6. The said groove $a$ is adapted to engage with the heads of the used primer and a new primer in the magazine C. The lock casing A is connected with the breech actuating mechanism in such a manner that it is caused to move axially in the box slide in addition to moving laterally during the opening and closing of the breech. For this purpose we employ lever mechanism which comprises in the example shown plates or levers A′ pivoted at $a'$ to the lock casing A, for locking the said casing to the box slide B and also for withdrawing it axially and levers A² for effecting the lateral movement of the lock casing, the last mentioned levers being pivotally connected at $a^2$ to the locking plates or levers A' and at $a^3$ to a sliding member $A^3$ having lateral arms $A^{3x}$ which engage in guides in the box slide B. The said sliding member $A^3$ is attached by means of a guide bolt D to the link D' of the breech actuating mechanism. The said plates or levers A', the levers $A^2$ and the lateral arms $A^{3x}$ are arranged above and below the lock casing as is clearly shown in Figs. 6 to 11. The levers A' are formed with bosses $a^4$ working in cam shaped grooves $a^{4x}$ (Fig. 4) in the interior of the box slide. The said levers are also formed with projections $a^0$, and the pivots a' of the said lever are furnished with projections $a^{xxx}$ adapted to engage with the striker to retract the needle from the face of the primer while the lock is being drawn back as is shown in Fig. 7.

To effect a step by step rotation of the primer magazine C a pawl C' is in the example shown pivotally mounted on a boss $a^{3x}$ on the sliding member $A^3$ and is adapted during the closing movement of the breech mechanism, to engage with one of a series of teeth c' formed on the casing of the magazine C, the magazine being thereby given sufficient angular movement to place the rim of a new primer in the aforesaid groove a in the front of the lock casing A. In order to enable the rim of a new primer in the magazine to enter the said groove a, the latter has an opening at the top part as is clearly shown in Fig. 18. This opening is controlled by a spring catch $A^5$ which is depressed by the engagement of the rim with an inclined surface thereon as is clearly shown in Figs. 19 and 20; when the primer has assumed the position shown in Fig. 20, the said spring catch resumes its original position and engages with the rim of the primer. In order to retain the magazine C in its displaced position we provide a spring controlled catch $C^2$ (Fig. 5) pivotally mounted at $c^2$ on the box slide B and adapted to engage with the teeth in the magazine casing. A positive instead of a spring controlled catch may be employed and in this case suitable means are provided for disengaging it when the magazine C is being angularly displaced. The striker E is under the control of a spring E' which exerts its influence thereon through the intervention of a forked lever e. The forward end of the said spring abuts against a member e', which constitutes a spring clip for the primer and its fulcrum bears against the aforesaid catch $A^5$ so that the spring E' also controls the said catch.

The parts are normally in the position shown in Figs. 1 to 6, 9 and 15 with the locking plates or levers A' retaining the lock casing A in position by the engagement of lateral projections $a^x$ in front of extensions $b^x$ of the box slide, as clearly shown in Figs. 6 and 15. The initial movement of the breech mechanism in opening the breech gives motion to the sliding member $A^3$ and the levers $A^2$ which are connected to the said sliding member and to the locking plates or levers A', to cause the latter to turn about their pivotal connections a' with the lock casing and the lateral projections $a^x$ to move out of engagement with the extensions $b^x$ of the box-slide.

The cam shaped surfaces $a'^x$ of the levers A' engage with the stem b' of the vent axial and produce a wedging effect to move the lock casing rearwardly and to thereby dislodge the primer from its chamber. During the further movement of the breech mechanism, the coöperation of the bosses $a^4$ on the levers A' with the straight portion of the grooves $a^{4x}$ (Fig. 4) causes the lock casing A to move farther toward the rear till it assumes the position shown in Figs. 10, 13 and 16, the projections $a^0$ on the levers A' engaging with the extensions $b^x$ of the box slide to restrain the rearward movement of the lock casing. The lock casing has during this movement withdrawn the used primer from its chamber in the vent axial and a new primer from the magazine C by the groove a formed in the front of the said lock casing engaging with the heads of the primers. Meanwhile the projections $a^{xxx}$ on the plates or levers A' have retracted the striker E. The further opening movement of the breech mechanism causes the lock casing A to be displaced laterally, thereby moving the spent primer toward the new primer which is prevented from shifting by its contact with a lateral wall $B^x$ of the box slide B as shown in Figs. 13 and 14. When the lock casing is nearing the final stage of its lateral movement, the new primer engages with an inclined surface on the spring clip e' holding the used primer in position and displaces the said clip to allow the used primer to be ejected through a chute $A^0$, by its engagement with the new primer at the final stage of the movement of the lock casing as shown in Figs. 14 and 17. The new primer is then held in the position previously occupied by the used primer by means of the said spring clip e' as shown in Figs. 13, 14, 16 and 17. On the movement of the breech actuating mechanism toward its closed position, the lock casing A is first moved laterally so that the new primer is opposite the vent axial B'. The lock casing is then moved forward to insert the primer in the chamber of the vent axial, the projections $a^x$ on the locking plates or levers A' holding the casing A in position by its engagement in front of the extensions $b^x$ of the box slide B as aforesaid. When the lock casing is being locked to the box slide the pawl C' causes the magazine C to rotate one step, thus bringing a new primer into the position previously occupied by the primer extracted from the magazine, as aforesaid. The groove a on the front of the lock casing A then engages with the head of a new primer in the magazine C so that when the breech is opened, the aforesaid cycle of operations is repeated.

The magazine C is in the example shown capable of being refilled without the necessity of dismantling the box slide, a chamber B° in the box slide serving for the introduction of the primers into the magazine. If desired the parts may be so arranged that a charged magazine can be substituted for an empty one.

We wish it to be understood that we do not desire to limit ourselves to the particular construction and arrangement of magazine above described.

What we claim and desire to secure by Letters Patent of the United States is:—

1. In firing mechanism for ordnance, the combination with a primer carrier and a primer manipulating member, of means for causing the said member to simultaneously extract the used primer from the vent axial and a new primer from the carrier, to eject the used primer and to then positively and completely insert the new primer in its chamber of the vent axial.

2. In firing mechanism for ordnance, the combination with the lock casing, a primer carrier, and a primer manipulating member forming part of the lock casing, of means for causing the said member to simultaneously extract the used primer from the vent axial and a new primer from the carrier, to eject the used primer and to then positively and completely insert the new primer in its chamber of the vent axial.

3. In firing mechanism for ordnance, the combination with a primer carrier and a primer manipulating member, of means for imparting to said carrier a step by step movement, and means for causing the said member to simultaneously extract the used primer from the vent axial and a new primer from the carrier, to eject the used primer and to then positively and completely insert the new primer in its chamber of the vent axial.

4. In firing mechanism for ordnance, the combination with a primer carrier and a primer manipulating member, of means for causing the said member to move rearwardly and extract the used primer from the vent axial and a new primer from the carrier, to move laterally and eject the used primer, to move laterally in the reverse direction, and to then move forwardly to insert the new primer in its chamber of the vent axial.

5. In firing mechanism for ordnance the combination with the lock casing, a rotary primer carrier and a primer manipulating member forming an integral part of the lock casing, of means for causing said member to move rearwardly, to move to and fro laterally and to then move forwardly.

6. In firing mechanism for ordnance the combination with the lock casing, a primer carrier and a primer manipulating member forming part of the lock casing, of means for causing the said member to move rearwardly and extract the used primer from the vent axial and a new primer from the carrier, to move laterally and eject the used primer, to move laterally in the reverse direction and to then move forwardly to insert the new primer in its chamber of the vent axial.

7. In firing mechanism for ordnance, the combination with the lock casing having a groove in the front face thereof, of a primer carrier, and means for causing the said lock casing to simultaneously extract the used primer from the vent axial and a new primer from the carrier, to eject the used primer and to then positively and completely insert the new primer in its chamber of the vent axial.

8. In firing mechanism for ordnance the combination with a rotary primer carrier, of a lock casing having a groove in the front face thereof for engagement with the head of a primer in the magazine, and means for causing said lock casing to move rearwardly, to move to and fro laterally, and to then move forwardly.

9. In firing mechanism for ordnance, the combination with the lock casing having a groove in the front face thereof, of a primer carrier, and means for causing the said lock casing to move rearwardly and extract the used primer from the vent axial and a new primer from the carrier, to move laterally and eject the used primer, to move laterally in the reverse direction and to then move forwardly to insert the new primer in its chamber of the vent axial.

10. In firing mechanism for ordnance, the combination with the lock casing having a groove in the front face thereof, of a primer carrier, means for imparting to said carrier a step by step movement, means for causing lock casing to move rearwardly, to move to and fro laterally and to then move forwardly.

11. In firing mechanism for ordnance, the combination with the lock casing having a groove in the front face thereof, of a primer carrier, means for imparting to said carrier a step by step movement, means for causing the said lock casing to move rearwardly and extract the used primer from the vent axial and a new primer from the carrier, to move laterally and eject the used primer, to move laterally in the reverse direction and to then move forwardly to insert the new primer in its chamber of the vent axial.

12. In firing mechanism for ordnance, the combination with a primer carrier and a primer manipulating member, of lever mechanism for causing the said member to simultaneously extract the used primer from the vent axial and a new primer from the carrier, to eject the used primer and to then positively and completely insert the new primer in its chamber of the vent axial.

13. In firing mechanism for ordnance, the combination with the lock casing, a primer carrier and a primer manipulating member forming part of the lock casing, of lever mechanism for causing the said member to simultaneously extract the used primer from the vent axial and a new primer from the carrier, to eject the used primer and to then positively and completely insert the new primer in its chamber of the vent axial.

14. In firing mechanism for ordnance, the combination with the lock casing having a groove in the front face thereof, of a primer carrier, lever mechanism for causing the said lock casing to move rearwardly and extract the used primer from the vent axial and a new primer from the carrier, to move laterally and eject the used primer, to move laterally in the reverse direction, and to then move forwardly to insert the new primer in its chamber of the vent axial.

In testimony whereof we affix our signatures in presence of two witnesses.

ARTHUR TREVOR DAWSON.
GEORGE THOMAS BUCKHAM.

Witnesses:
   HENRY KING,
   JNO. R. CASWELL.